No. 780,961. PATENTED JAN. 24, 1905.
M. H. PATNODE.
DRAFT EVENER.
APPLICATION FILED MAR. 14, 1904.

Witnesses
Chas. K. Davies.
N. E. Moore.

Inventor
M. H. Patnode
by Jno. N. Moore
Attorney

No. 780,961.  Patented January 24, 1905.

UNITED STATES PATENT OFFICE.

MUTTY H. PATNODE, OF BURROAK, KANSAS.

DRAFT-EVENER.

SPECIFICATION forming part of Letters Patent No. 780,961, dated January 24, 1905.

Application filed March 14, 1904. Serial No. 198,144.

*To all whom it may concern:*

Be it known that I, MUTTY H. PATNODE, a citizen of the United States, residing at Burroak, in the county of Jewell and State of Kansas, have invented certain new and useful Improvements in Draft-Eveners, of which the following is a specification.

My invention relates to improvements in draft-eveners; and the object of my invention is the provision of a draft-evener which will be of simple, inexpensive, and durable construction and which will effectively divide the strain or draft upon the animals and which will be thoroughly practical for the intended purpose.

The invention consists of a draft-evener embodying novel features of construction, combinations, and arrangements of parts, substantially as shown, described, and specifically defined by the claim.

Figure 1:
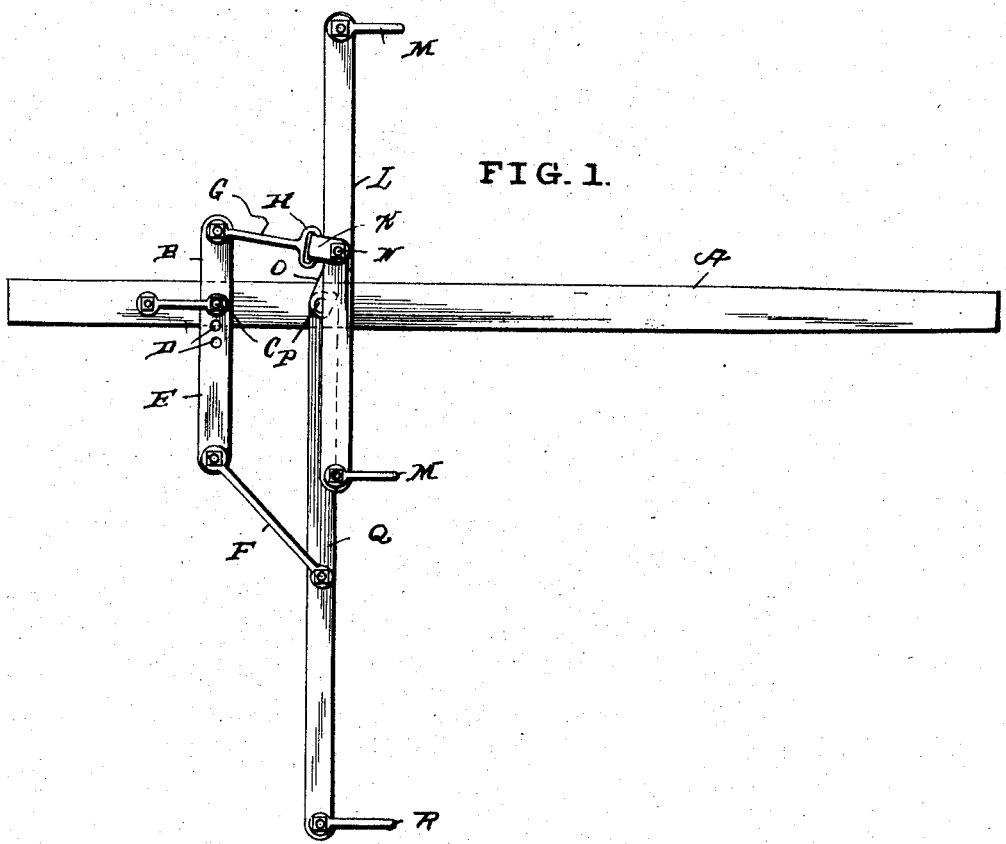
Figure 2:
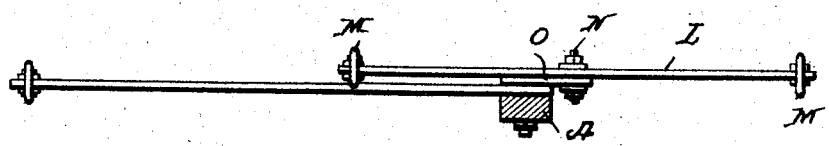
Figure 3:
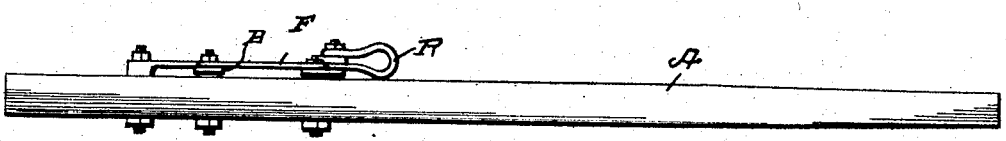

Figure 1 represents a top plan view of my draft-evener. Fig. 2 represents a front elevation or edge view, and Fig. 3 represents a side elevation, of the draft-evener.

In the drawings the letter A designates the pole or tongue, upon which near its inner end is secured the arms B, through which passes the bolt C, said bolt also passing through one of the series of openings D in the bar E. To one end of said bar is pivoted the link F, and to the other end is pivoted the shorter link or arm G, said link or arm G being formed with a slotted head H. Said slotted head receives the staple of bail K, pivoted centrally upon the swingletree L, carrying the clevises M, and also pivoted to the bolt N, forming the pivot of the swingletree, is the short plate O, the inner end of which is mounted on the pin or pivot P, which pin or pivot also pivotally connects the inner end of the long bar Q, which carries at its outer end the clevis R, and to said long bar is also pivotally connected the outer end of the link F.

From this construction it will be observed that the swingletree and the long draft-bar can be adjusted or swung transversely through the medium of the short adjustable bar and that by means of the connection between the short bar and the swingletree and long draft-bar a connection is provided which distributes the strain or draft of the animals equally, and thus produces an efficient and practical device for the purpose invented.

I claim—

The draft-evener herein shown and described, consisting of the pole or tongue, the fastening device secured to said pole or tongue, the short transverse bar having a series of transversely-arranged openings for forming a pivotal and adjustable connection with the fastening on the tongue, the short link connected to one end of said bar and formed with an elongated eye, the long link connected to the other end of said bar, the swingletree, the staple or bail connecting the swingletree with the elongated eye of said short link, the plate connected with the tongue and with the pivot connecting the swingletree and staple, and the long draft arm or bar pivoted at its inner end to the tongue and plate and connected pivotally near its center with said long link.

In testimony whereof I have signed my name to this specification in presence of two witnesses.

MUTTY H. PATNODE.

Witnesses:
E. S. POWELL,
J. A. PAYNE.